May 1, 1951  C. J. PRAY  2,551,221
CASTING FLY
Filed May 17, 1947

INVENTOR.
C. JIM PRAY.
BY
Wm H Atkinson
ATTORNEY.

Patented May 1, 1951

2,551,221

UNITED STATES PATENT OFFICE 2,551,221

CASTING FLY

Claire James Pray, Eureka, Calif.

Application May 17, 1947, Serial No. 748,692

7 Claims. (Cl. 43—42.25)

My present invention relates to artificial fish lures and more particularly to an artificial lure of the casting fly type.

An object of my invention is to provide a new and improved construction for flies of the so-called wet or sinking type which will permit a duplication of any particular fly in substantially identical appearance.

Another object of the invention is to provide a construction for flies of the casting type which will be found particularly effective in the taking of larger game fish such as salmon, steelhead and rainbow trout.

Another object of the invention is to provide a new and improved method of forming the body of a fly or other artificial casting lure in which metallic bead-like members are superimposed upon a conventional wrapping as a protection to render the fly more durable and at the same time provide an effective deception of the body of the insect to be imitated.

Another object of the invention is to provide a new and novel construction for artificial lures of the so-called casting type in which the hackle, wing and tail elements of the insect are finally secured to the shank of a hook in an enduring and lasting manner by means of a novel metallic encasement.

Other objects and advantages of my invention will be in part evident to those skilled in the art and in part hereinafter pointed out in connection with the accompanying drawing, wherein there is shown by way of illustration and not of limitation several preferred embodiments of the invention.

Figure 1:
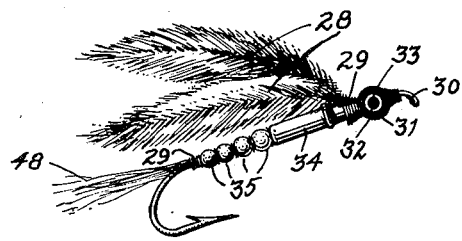
Figure 1 is a side view of an optic streamer constructed in accordance with one form of my present invention.

Reference is now made to the accompanying drawing for a more detailed description of my invention. While the several figures of this drawing illustrate fully and completely the structural features and advantages of the invention they nevertheless in a way fail because of color limitations to fully illustrate the effective manner in which my invention adapts itself to the imitation of the various flies which the several showings are intended to imitate. It is therefore to be understood in considering the various figures of the drawing that the wings, hackle and tail forming elements may take various colors ranging from a pure white, through gray, blue and yellow to deep scarlet in color. In combination with these various colors in the wings, tail and hackle the body and head portions may likewise be finished in different colors. Where a polished metal finish rather than a flat color is desired, the body and head forming portions as hereinafter described, may be given a polished finish. For example, when the beads are of brass the finish will be of polished brass. Whereas by forming the beads of a white metal it will be possible to get a silver-like finish. Various metallic shades may also be obtained by using beads formed of different color alloys.

Figure 2:
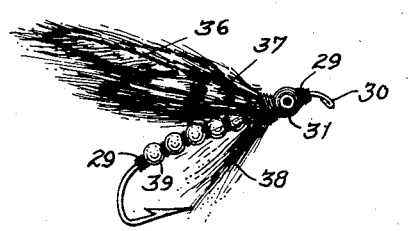
Figure 2 is another form of optic streamer constructed in accordance with the invention.

From the above it will be seen that my invention lends itself to the reproduction of practically any standard well known fly but it is to be understood that my invention is equally applicable to the reproduction of various other natural and artificial forms of flies and bugs such as are used in casting for larger game fish. In Figures 1 and 2 there are shown two varieties of a so-called optic streamer. The fly of Figure 1 has brownish and black streaked feather-like wings 28 that are secured to the forward end of a wrapping 29 of ductile metallic wire and preferably copper wire which extends along the shank of the hook. At the forward end of this wrapping 29 and immediately behind the eye 30 of the hook there is an enlarged bead-like member 31 which is crimped over the wrapping 29 at this point. This bead-like member 31 is preferably in black enamel with a yellow annular portion 32 which will surround and form a pupil 33. Immediately behind the wings 28, the wrapped shank of the hook carries an elongated bead-like member 34 which is crimped over the wrapping 29. This bead-like member 34 has its major portion painted black, while at its leading end it is enameled in a bright yellow. As a continuation of the body of the insect thus formed, the shank of the hook carries a plurality of hollow metallic beads 35 which will be crimped over the remaining portion of the wrapping 29. In this instance the beads 35 may have a polished gold or silver finish. In the other form, as shown in Figure 2 of the drawing, the shank of the hook is also wrapped with a fine wire as at 29 throughout its entire length, and at its forward end it has a similarly painted hollow bead-like optic member 31 which is crimped over the wrapping 29 at this point. This particular streamer has main and secondary wings, designated respectively by the numerals 36 and 37, of contrasting colors, and in addition it has a depending scarlet hackle 38. For its body this streamer is completed by the superimposition and crimping of a plurality of bead-like members 39 over substantially the entire remaining length of the wrapping 29 upon the shank of the hook. In connection with these two described embodiments of the invention, it will be readily seen that by varying the colors of the wings and/or hackle and also the finish and arrangement of the bead-like members 34, 35 and 39, it will be possible to produce an infinite number of artistic designs which might be presumed to attract the particular fish to be sought. If the fly should be combined with a spinner as is sometimes practiced, the beads 35 and 39 of these two embodiments might all have a polished silver or gold finish; likewise it would also be possible in connection with the latter described embodiment to finish the alternate beads 39 of contrasting colors.

Figure 3:
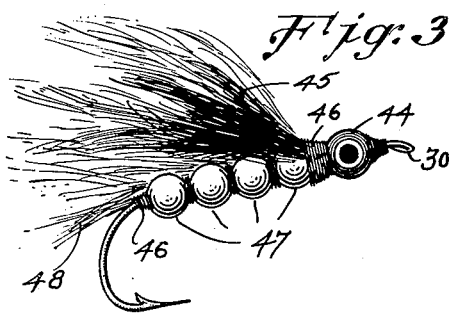
Figure 3 shows a casting fly of the optic type which is particularly designed for use in casting for bass and other large game fish.

As a further modification of the invention there is shown in Figure 3 of the drawing a casting lure which will be found particularly suited for use in casting for salmon and other larger inland fish, such as bass. This particular lure combines the optic streamer characteristic in that it has, as a head for the fly, a large hollow metallic bead-like member 44 such as has been described hereinabove and following this bead-like member 44 there is an extremely full brush-like hackle 45 of cardinal or scarlet red that is secured by a wrapping 46 upon the shank of the hook. Immediately behind the hackle 45 there is a plurality of smaller hollow metallic bead-like members 47 which are crimped over the wrapping 46 extending along the shank of the hook. In this instance the bead-like members 47 may be of any desired color but, by preference, they also should have a bright metallic gold or silver finish. A tail 48 of hair or hackle may also be added if desired.

Figure 4:
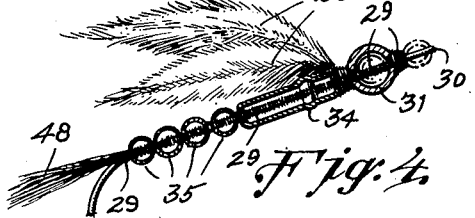
Figure 4 is a sectional view showing the details of construction of the fly shown in Figure 1 of the drawing.
Figure 5:
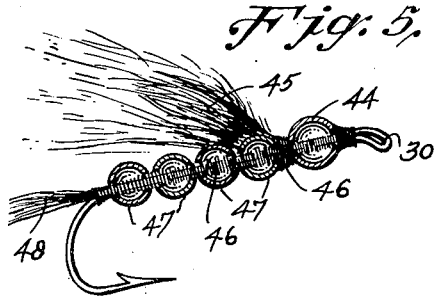
Figure 5 is a sectional view showing the construction of the fly in Figure 3 of the drawing.

Upon now referring to Figures 4 and 5 of the drawing, which are respectively sectional views taken through the optic streamers previously described and illustrated in Figures 1 and 3 of the drawing, it will be noted that the wrappings 29 and 46 of these two flies are only sufficient to form a foundation upon which the bead-like members may be crimped and held in place. In some cases where the demand does not otherwise dictate, the wrappings 29 and 46 may also serve to secure a tail 48 at the end of the fly. These views also clearly indicate that because of the hollow character of the bead-like members there will be formed air cavities about the encased wrappings which will provide buoyancy that will compensate for the added weight which might otherwise be added to the fly by the addition of the metallic body forming bead-like members. When the flies have been constructed, as here shown, it will be understood that as a final finish they will be coated with a suitable waterproof lacquer which will protect any exposed portions of the wrappings about the shank of the hook and at the same time lend permanence to the finish of the various bead-like members which are incorporated in the head and body structure.

A further advantage in the use of metal in this manner is that when colored, the colors will be more truly reproduced under water and therefore unlike the silk and chenile wrappings of the prior art, the yellows will not turn into greens, which is the case when these materials are submerged in bluish water. By like reasoning it will be also readily seen that where the metallic finish is desired the metallic base or body thus formed will be more permanent than is the case with metallic tinsels such as are now used to provide the metallic finish of the similar prior art flies. A further advantage possessed by my invention is that by providing standard sizes and shapes of split metallic bead-like members, it will be possible to reproduce the body of any particular fly in identical form by merely selecting the proper bead-like members. This, in the past, has been one of the major faults with hand tied flies for no two operators have found it possible to reproduce the bodies of two similar flies in which the appearance is substantially the same.

Figure 6:
Figures 6 and 7 are perspective views showing two forms of metallic bead-like members which I may use in the practice of my invention.
Figure 7:
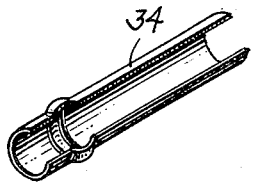

It is believed that the natural construction of the beads hereinabove described will be clearly understood, but as showing preferred forms which these split beads may take, there is shown in Figure 6 an elongated bead of the type described and illustrated in the preceding figures of the drawing, while in Figure 7 there is shown one of the larger split beads such as is used for a head of an optic streamer, or in small dimensions, as the body portions of the fly.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. An artificial casting fly for game fish, comprising a hook having the conventional barb and line engaging eye, wings, and hackle elements secured to the shank of said hook by wrappings of fine wire, and a plurality of hollow metallic bead-like members crimped over the wire wrappings on the shank of the hook and cooperating therewith to secure said wings, and hackle elements firmly in place and also form a head and body for the fly.

2. In a casting fly for game fish, the combination of a hook having the conventional barb and line engaging eye, a foundation wrapping of fine wire extending along the shank of said hook, wing and hackle elements secured at the forward end of said shank by said wrapping, a plurality of hollow metallic bead-like members crimped along and over said wrapping between said wing and hackle elements to form the body of the fly, and a larger metallic bead-like member crimped over the shank immediately behind the eye of said hook to form a head for the fly.

3. A casting fly for game fish, comprising a hook having a straight shank and the conventional barb and line engaging eye, a wrapping of fine wire extending along the shank of said hook and secured thereupon as a foundation, a hollow metallic bead-like member crimped over said wrapping immediately behind the line engaging eye of the hook, a rearwardly extending hackle tied to said wrapping immediately behind said bead-like member, and a series of additional split hollow metallic bead-like members crimped in abutting relation over the remaining length of said wrapping and forming the body of the fly.

4. A casting fly for game fish, comprising a hook having a straight shank and the conventional barb and line engaging eye, a wrapping of fine copper wire extending along the shank of said hook and secured thereupon as a foundation, a ductile hollow bead-like member crimped over said wrapping immediately behind the line engaging eye of the hook and forming the head of the fly, a rearwardly extending hackle tied to said wrapping immediately behind said bead-like member, and a series of smaller ductile bead-like members crimped in abutting relation over the remaining portion of said foundation forming the body of the fly.

5. A casting fly for game fish, comprising a hook having a straight shank and the conventional barb and line engaging eye, a foundation forming material wrapped about and extending along the shank of said hook, a hollow metallic bead-like member crimped over said wrapping immediately behind the line engaging eye of the hook, a rearwardly extending hackle tied to said wrapping immediately behind said bead-like member, and a series of smaller diameter, hollow bead-like members crimped in abutting relation over the remaining portion of said wrapping and forming the body of the fly.

6. The method of forming casting flies and similar artificial casting bait which comprises applying hackle and tail elements to the shank of a hook in the conventional manner with fine wire, and completing the body portion of the fly by crimping a plurality of hollow metallic bead-like members over said wrapping in cooperating relation with said hackle and tail elements to simulate the head and body of the fly.

7. The method of forming an artificial casting fly which comprises wrapping a foundation of fine wire about the shank portion of a conventional hook from its eye to the point where the body of a fly is to terminate, securing hackle and wing elements by said wrapping at a point spaced from the eye of the hook, crimping a large split metallic bead-like member over said wrapping between said hackle and the eye of said hook to constitute the head of the fly, and completing the body portion of the fly by crimping a plurality of additional split metallic bead-like members of smaller diameter in abutting relation over the remaining portion of said wrapping, said additional bead-like members having a polished metallic finish and said large head forming, bead-like member being finished to give the appearance of large eyes upon the fly so formed.

CLAIRE JAMES PRAY.

REFERENCES CITED

The following references are of record in the file of this patent:

UNITED STATES PATENTS

| Number | Name | Date |
| --- | --- | --- |
| 661,788 | Brooke | Nov. 13, 1900 |
| 2,039,039 | Steen | Apr. 28, 1936 |

FOREIGN PATENTS

| Number | Country | Date |
| --- | --- | --- |
| 19,148 | Great Britain | of 1891 |